United States Patent

Bernhardt et al.

[11] Patent Number: 5,115,558
[45] Date of Patent: May 26, 1992

[54] APPARATUS FOR PRELOADING ANTIFRICTION SHAFT BEARINGS LOCATED IN A CASING

[75] Inventors: Bodo Bernhardt; Jan Dijkhuis, both of Pulheim; Theo Molders, Dormagen, all of Fed. Rep. of Germany

[73] Assignee: Ford Motor Company, Dearborn, Mich.

[21] Appl. No.: 518,398

[22] Filed: May 3, 1990

[30] Foreign Application Priority Data

May 19, 1989 [DE] Fed. Rep. of Germany ....... 3916314

[51] Int. Cl.⁵ .............................................. B23P 19/04
[52] U.S. Cl. ........................................... 29/705; 29/407; 29/898.09; 73/118.1; 73/862.49; 384/626
[58] Field of Search ............ 29/407, 705, 898.09; 73/118.1, 862.49; 384/626

[56] References Cited

U.S. PATENT DOCUMENTS

| | | | |
|---|---|---|---|
| 2,606,361 | 8/1952 | Keller | 29/705 |
| 3,100,989 | 8/1963 | Jones | 73/862.49 |
| 3,287,966 | 11/1966 | Haan et al. | 73/862.49 |
| 3,698,056 | 10/1972 | Pierce et al. | 29/407 |
| 3,715,909 | 2/1973 | Wolanin | 73/118.1 |
| 4,744,153 | 5/1988 | Brand | 29/705 |

Primary Examiner—P. W. Echols
Assistant Examiner—David P. Bryant
Attorney, Agent, or Firm—Frank G. McKenzie; Roger L. May

[57] ABSTRACT

Apparatus for determining shim thicknesses used to position antifriction bearings on shafts located in recesses formed in a casing. The shafts, fitted with the bearings, are installed in the casing and located with compensating discs or shims. An apparatus plate of predetermined thickness is located between the flanges of two casing halves, split perpendicular to the shaft axis. An axial force measuring cell is fitted on the antifriction bearing and the two casing halves are clamped together with a predetermined load. Axial forces produced by the clamping action of the casing on the shafts are measured during operation and correlated with a predetermined, desired axial force by a computer. The optimum thickness of the compensating discs for the individual shafts is calculated from data supplied to the computer.

9 Claims, 3 Drawing Sheets

APPARATUS FOR PRELOADING ANTIFRICTION SHAFT BEARINGS LOCATED IN A CASING

BACKGROUND OF THE INVENTION

1. Field of the Invention

This invention relates to the field of antifriction bearings used to support rotating shafts. The invention applies particularly to preloading such bearings.

2. Description of the Prior Art

German Patent DE-PS 19 02 254 describes a technique for determining the necessary position of friction bearings supporting shafts on a casing. The technique described there involves measuring bearing parameters, such as the deformation or frictional moment carried by the bearing, for determining the initial tension. But the technique leads to deviations, which are limited according to that patent.

Apparatus for measuring and/or monitoring the axial force on a tool spindle mounting is described in German Patent DE-PS 26 48 192. There, the antifriction bearing of a tool spindle is accommodated in a monitoring socket, which is received in a casing. The monitoring socket remains permanently located in the transmission casing. This requirement is acceptable for a machine tool, but it is uneconomical for determining the necessary position of antifriction bearings on shaft mountings in casings to establish preload forces of bearings used in mass-produced transmissions, engines, etc.

SUMMARY OF THE INVENTION

An object of the invention is to provide a method for determining the necessary position of the antifriction bearings that support shafts mounted in casings, such as a gear box housing, the position of the bearings being established by compensating discs or shims that account for tolerances of the assembled parts. The axial force that is produced on the bearings is measured directly using simple apparatus, or an axial distance, adjusted while a gear is running, is measured at a predetermined desired axial force so that a reliable basis for an appropriate choice of compensating discs is provided.

A plate of specified thickness is located between flanges of casing halves, which are split perpendicular to the transmission shafts. Each shaft is supported on an antifriction bearing, and a compensating disc, whose thickness is determined empirically, is used. The two casing halves are clamped together by fastening bolts tightened to the correct operating torque magnitude. The resultant axial force occurring on the shafts, measured by an axial force measuring cell, are correlated with predetermined, desired axial forces by a computer and the optimum thickness of the compensating discs for the individual shafts is calculated. The axial forces occurring directly on each shaft are determined when the shaft mounting is assembled. The cumulative tolerances occurring on the shafts in the casing openings, and the setting behavior of the antifriction bearings are accounted for when determining the necessary position of the antifriction bearing. Temperature also can be accounted for when determining the position of the bearings using measured data concerning external diameters of the antifriction bearings and casing openings, in which the bearings are received. The change in height expected due to the assembly operation can be taken into consideration with correction factors when calculating the optimum thickness of the compensating discs.

When using the method of this invention and the apparatus for determining the necessary position of the antifriction bearings of the shaft mounting it is advisable to use, instead of axial force measuring cells for each shaft, axial distance measuring cells, loaded with predetermined desired axial forces. The measured axial distance, in conjunction with measured data concerning the diameters of the antifriction bearings, diameters of the casing opening and assembly temperature permit calculation of the optimal thickness of the compensating discs.

In the application of the method and apparatus of this invention to industrial scale transmission or engine assembly, and the axial force or axial distance measuring cells intended for the individual shafts are combined on an apparatus plate such that the measuring cells are already located in their appropriate positions for receiving the shaft ends provided with the antifriction bearings when the apparatus plate is installed in the casing.

BRIEF DESCRIPTION OF THE DRAWINGS

The invention is described in more detail with reference to the embodiment shown in the accompanying drawings.

DESCRIPTION OF THE PREFERRED EMBODIMENTS

Figure 1:
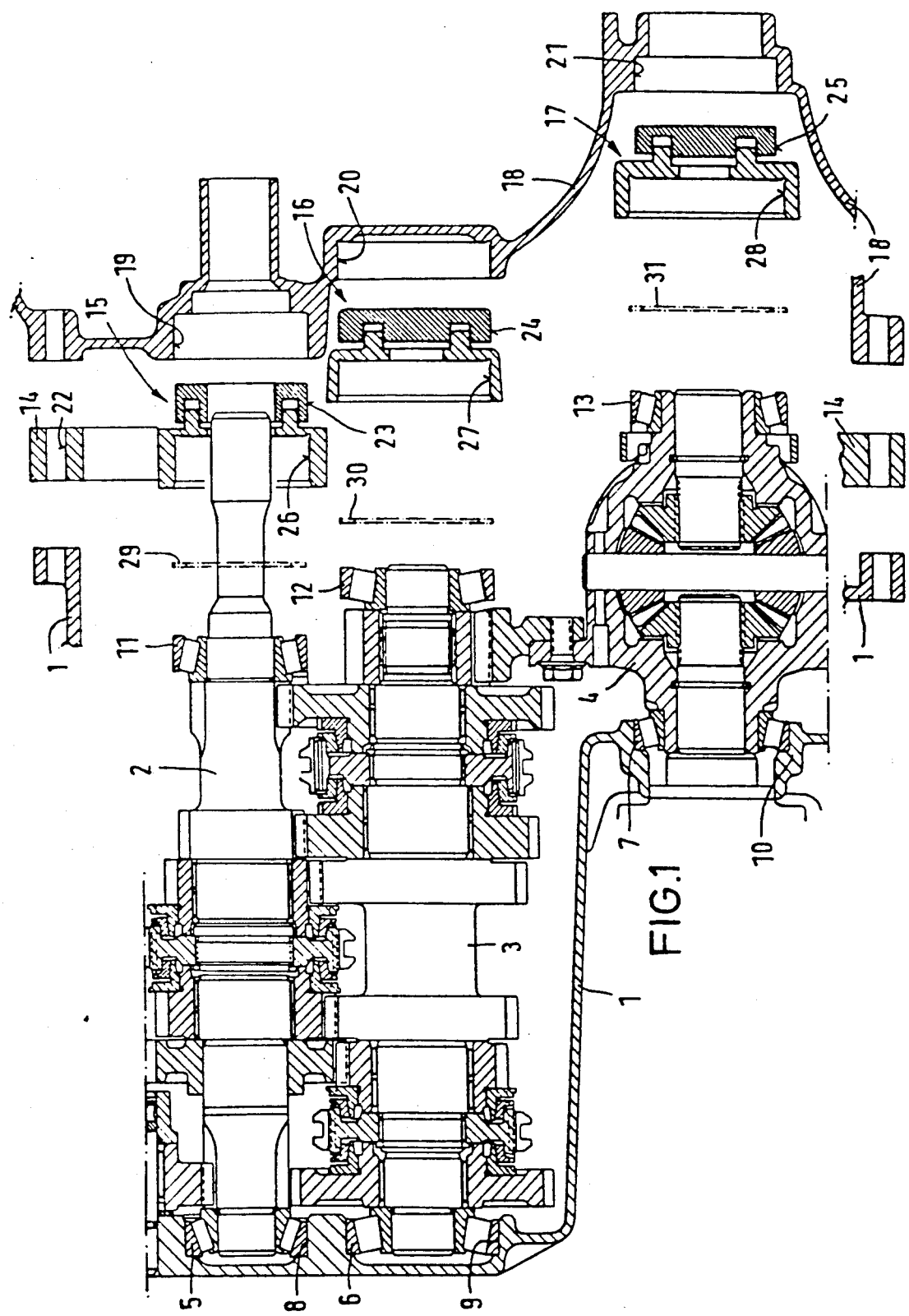
FIG. 1 is a cross section through the centerline of the shafts and central plane of the differential assembly of a transmission. The figure shows the first embodiment of the apparatus with axial force measuring cells of the type used in the testing and measuring technique.

In FIG. 1, the two casing parts and the plate are arranged with their axes parallel, but with the components spaced apart axially so as to illustrate more clearly the components of the assembly and the operation of this invention.

Three gear shafts, a driving shaft 2, a driven shaft 3, and a differential shaft 4 are arranged in the left-hand group shown in FIG. 1, i.e., casing half 1 of the front axle change-over differential gear. Tapered roller bearings 5, 6 and 7, received in corresponding casing openings 8, 9 and 10 of the casing half 1, are located at the left-hand ends of the gear shafts 2, 3 and 4.

Also shown in FIG. 1 are a plate 14 of predetermined thickness, the flange of the casing half 1, a measuring cell 15 for driving shaft 2, a measuring cell 16 for driven shaft 3, and a measuring cell 17 for differential shaft 4.

The second casing half 18 of the transmission casing, which is integral with the clutch casing in this example, is shown in the right-hand group of FIG. 1. Casing openings 19, 20 and 21 for receiving the antifriction bearings 11, 12 and 13 of the transmission are provided in the casing half 18.

The apparatus plate 14 and the flanges of the casing halves 1 and 18 have coaxial through-passages 22, by means of which the casings are clamped via suitable fastening bolts (not shown). plate 14 located between the adjacent flanges.

Each measuring cell 15, 16 and 17 has an external surface 23, 24 and 25, which fits loosely without radial pressure in corresponding casing openings 19, 20 and 21 of the second casing half 18. Each measuring cells 15, 16 and 17 has a bore 26, 27 and 28 in which the antifriction bearings 11, 12 and 13 are received loosely without radial pressure.

Compensating discs or shims 29, 30 and 31 are located adjacent antifriction bearings 11, 12 and 13, the thickness of the compensating discs being predetermined, according to experimental values corresponding to measured dimensions of the assembled parts. These discs are inserted into a bore 26, 27 and 28 of the respective measuring cell before the apparatus of this invention is clamped together with the casing halves 1 and 18.

Figure 2:
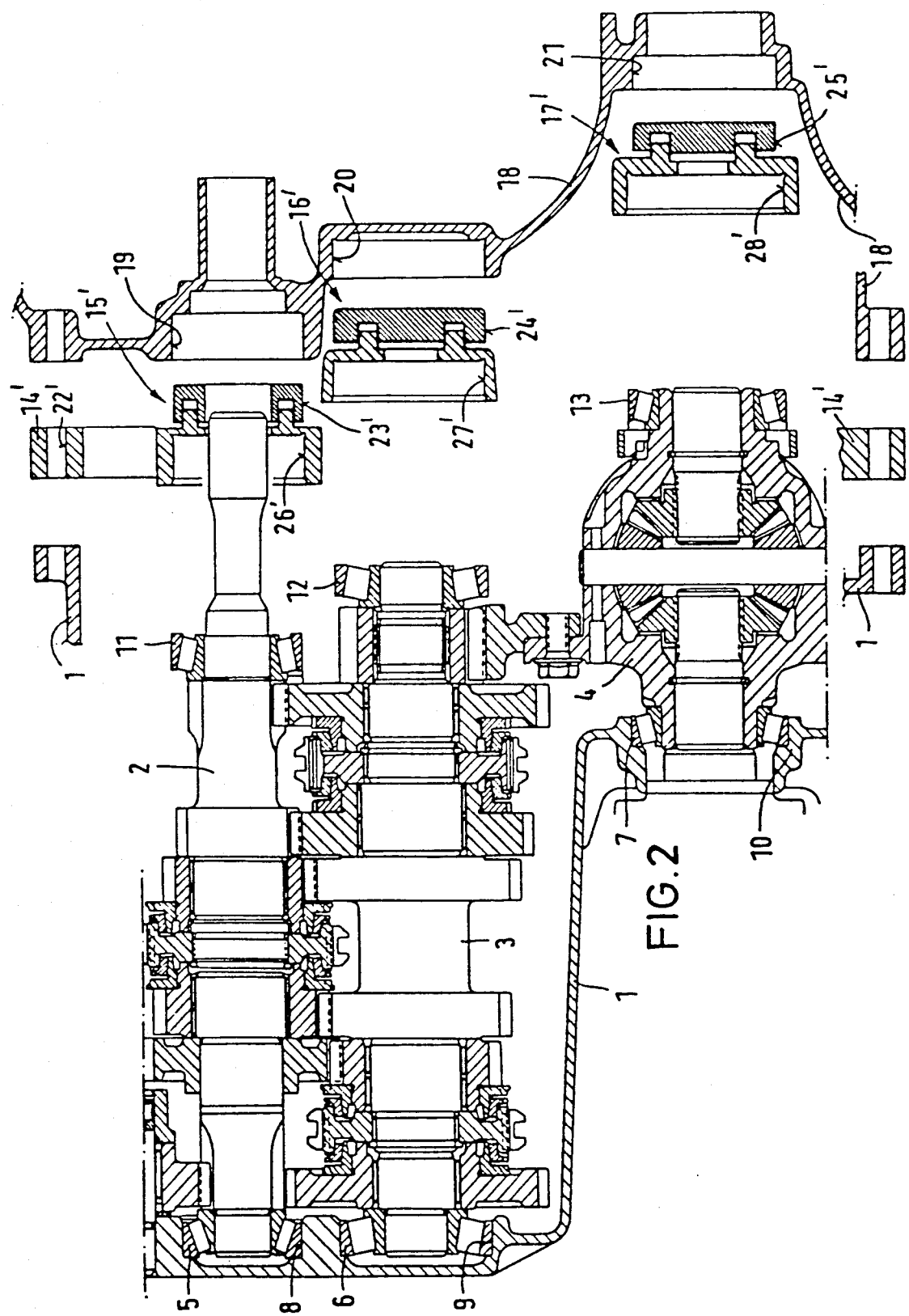
FIG. 2 is a cross section similar to that of FIG. 1, showing a further embodiment of the apparatus with axial distance measuring cells having integrated axial force with servo mechanisms.
Figure 3:
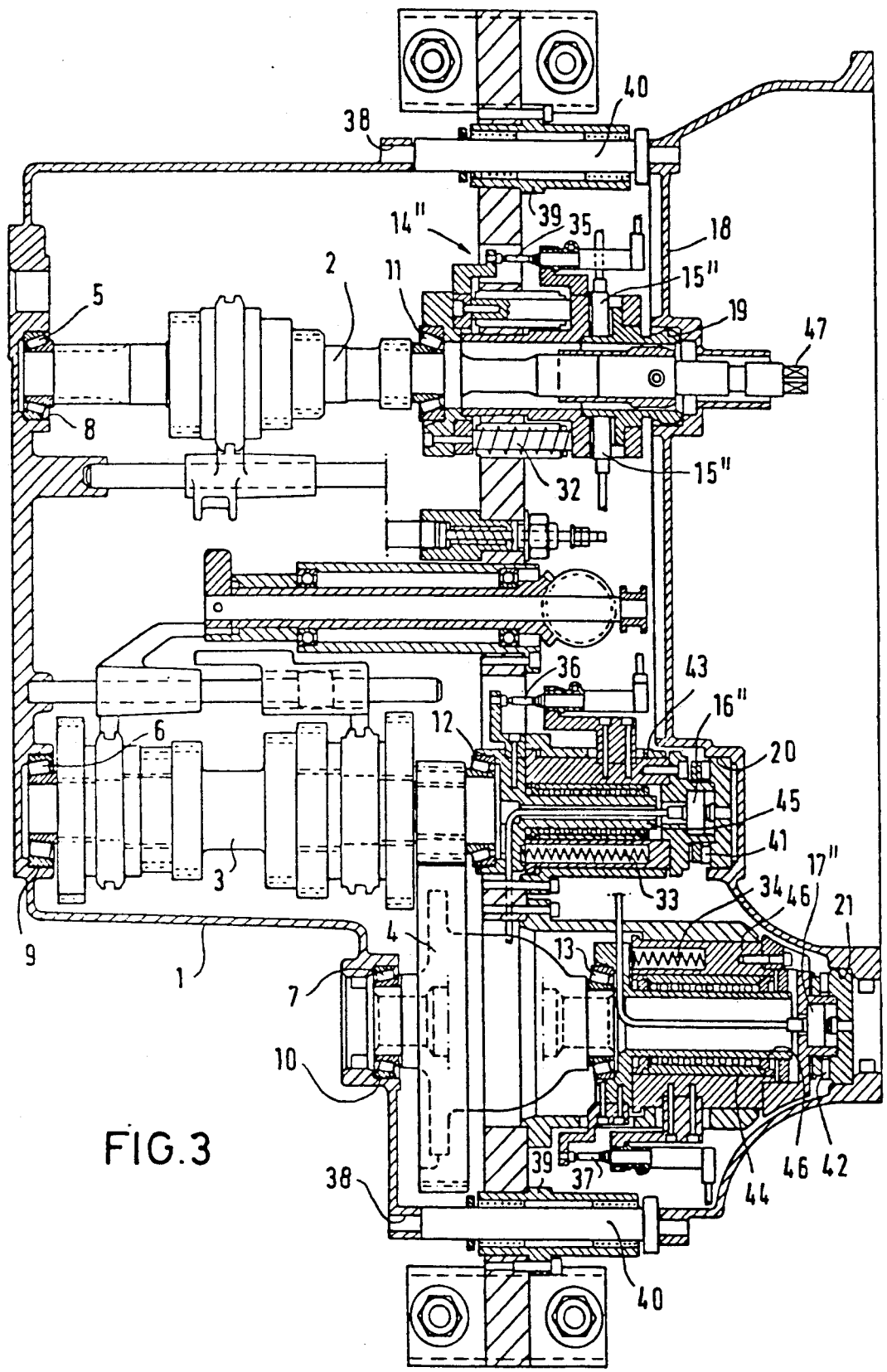
FIG. 3 is a cross section through a manual transmission showing another embodiment of the apparatus of this invention having axial force spring blocks, axial force measuring cells and axial distance measuring sensors. These devices are of the type intended for use in industrial-scale assembly.

In FIGS. 2 and 3, parts identical to those of FIG. 1, are identified with the same reference number and parts that differ somewhat from those of FIG. 1 are identified by identical reference numbers primed and double primed.

If the measuring cells are constructed as axial force measuring cells 15, 16, 17, they may be load cells having strain gauges electrically connected to a power source for producing an electrical resistance change from which axial force applied to the cell can be measured. The corresponding thickness of the compensating discs is taken into consideration when designing the length of bores 26', 27'28'.

If the measuring cells are axial distance measuring cells 15', 16' and 17' as in FIG. 2, it is unnecessary to provide suitable compensating discs because the distance measuring cells compensate the distance after the predetermined desired axial force is applied to the individual gear shafts. Thereafter distance measurement can be taken.

In the embodiment of the apparatus shown in FIG. 3, it is beneficial, in conjunction with axial distance measurement, to apply an axial force of roughly the desired magnitude by axial force spring blocks 32, 33 and 34. Adjacent the spring blocks are axial force measuring cells 15" 16" and 17". Axial displacement measuring sensors 35, 36 and 37 are connected in parallel with the corresponding spring blocks 32, 33, 34 so that the load developed in each spring block can be determined from the displacement of the spring block as indicated by its respective displacement sensor and the spring constant of the spring block.

The casing halves 1, 18 are supported on attachment bolt holes 38 in the flange by bolts 40, which are axially movable in a sleeve 39 carried on the apparatus plate 14" and have a length corresponding to the overall thickness of the apparatus plate.

Similarly, axial force measuring cells, 16" and 17" are supported by a joint 41, 42, located in the second casing half 18 which compensates for angular displacement.

Axial force spring blocks 33 and 34 are supported on the apparatus plate 14" by sleeves 43, 46 and bolts 45, 47 located within the corresponding sleeve. This arrangement allows axial compensating movement.

The general operation of the apparatus, according to this invention is described below.

Casing half 1 is inserted into a working block (not shown). The gear shafts 2, 3 and 4 with all the necessary components are installed therein. The apparatus plate 14 is located between the flanges of the casing halves and is correctly positioned using centering pins. Measuring cells 15, 16 and 17 and the compensating discs 29, 30 and 31 are placed in contact with the antifriction bearings 11, 12 and 13 of the gear shafts 2, 3 and 4. Care is taken to ensure that the electric wires from the measuring cell connections are guided outside the transmission casing. These wires are connected to a computer by running the lines appropriately on and in the apparatus plate 14.

When the transmission is assembled and a gear ratio has been engaged, driving shaft 2 is connected to a rotating driving device 47, which drives shaft 2 at approximately 200 rpm while the connecting bolts that connect the two casings halves are tightened to the specified starting torque.

When this torque is reached, the first measuring process begins after the gear has been running for a suitable period of time. The computer then calculates the optimum thickness of the compensating disc for each of the gear shafts 2, 3 and 4 on the basis of the first measuring process. The magnitude of the preload developed on the bearings of each shaft is established from the measurement of the load cells 15, 16 17 with reference to the thickness of the corresponding shim on each shaft.

To account for usual correction factors, such as the change of height of the antifriction bearings due to the driving fit during installation, the interaction between the bearing positions due to spring characteristics of the casing halves and ambient temperature, other appropriate data can be supplied as input to the computer and used to calculate the optimum thickness of the compensating discs.

When using the displacement measuring cells or axial force measuring cells, they allow the axial force to be determined accurately and reproducibly independently of the rigidity of the casing and transmission casing. Interaction between the bearing positions caused by faulty gripping is detected immediately and accommodated. The setting behavior of the antifriction bearings can be observed as the gear is running. Repeated measurement after running or after a test gives information about the bearing or setting behavior of the bearing positions.

The time-consuming, process of determining experimentally the thicknesses of compensating discs to produce the desired bearing preload by repetitively changing shim thicknesses and recording the load produced can be avoided in industrial scale transmission or engine assembly by using axial displacement measuring cells. The optimum thickness of the installed compensating discs is calculated by predetermining the preload or the axial force on the various gear shafts and bearings while allowing for other correction factors such as the change in axial dimension of the antifriction bearings due to the driving fit during installation and due to ambient temperature in the assembly area.

It is more desirable if the apparatus employs axial displacement measurement cells capable of applying a predetermined axial force to the shaft mounting by relatively simple, mechanical, axial force spring blocks, instead of highly expensive, hydraulically loadable and controllable axial displacement measuring cells. Adjacent these blocks are simple axial force measuring cells, such as strain gauged load cells, which indicate the magnitude of bearing preload on the basis of the change in electrical resistance produced in the strain gauges by the preload. Axial displacement measuring sensors, connected in parallel with the spring blocks indicate axial displacement of the spring blocks produced by the preload. This measured displacement (representing shim thickness) and the spring rate of the spring block are used to determine the magnitude of the preload on the bearing and shaft. The preload is then correlated with the displacement to produce a data base of such preloads and shim thickness for use by the computer to determine the optimum shim thickness from the measured bearing load when the casing halves are joined before final assembly with shims installed.

When the present invention is used in industrial transmission or engine assembly, it is beneficial to connect the apparatus plate to the individual measuring cells or to the combination that includes measuring cells, spring blocks, and measuring sensors. In this way, apparatus plate and measuring cells can be installed in one operation by an automatic handling device. Similarly, the second casing half can be installed by an automatic handling device and the two casing halves can be clamped using pressing rams. These rams act upon the bolt positions and allow simpler opening after the measuring process for insertion of the compensating discs, whose thicknesses have been determined by the calculation and reference to electronically stored empirical data used by the computer to determine the optimum shim thicknesses.

Having described a preferred embodiment of our invention what we claim and desire secured by U.S. letters patent is:

1. An apparatus for preloading antifriction bearings located within a casing, said casing comprising first and second casing adapted for mutual connection, and having a first bearing recess in the first casing portion and second bearing recess in the second casing portion, a tightenable attachment for forcing the casing into mutual contact, a first bearing located in the first bearing recess, a second bearing, and a shaft supported on the first bearing and on the second bearing, said apparatus comprising:
    a plate located between the casing portions having a recess within which the second bearing is located;
    means contacting the second bearing recess at a first axial side and facing the second bearing at a second axial side opposite the first side for measuring the magnitude of forces directed along the axis of the shaft developed between the second bearing and the second bearing recess when the attachment is tightened; and
    a replaceable shim supported on the shaft, the shim being located between the first bearing and the first bearing recess or between the second bearing and the recess of said plate.

2. The apparatus of claim 1 wherein the casing further comprises first and second casing flanges located on the first and second casing portions, respectively, having mutually facing planar surfaces that are substantially perpendicular to the axes of the shafts.

3. An apparatus for preloading antifriction bearings located within a casing, said casing comprising first and second casing portions adapted for mutual connection, and having a first bearing recess in the first casing portion and second bearing recess in the second casing portion, a tightenable attachment means for forcing the casing portions into mutual contact, a first bearing located in a first bearing recess, a second bearing located in a second bearing recess, said first and second bearings having a surface adapted for contact with its respective bearing recess, and a shaft supported on said first bearing and on said second bearing, said apparatus comprising:
    a plate located between the casing portions having a recess within which the second bearing is located;
    means contacting the second bearing recess at a first axial side facing the second bearing at a second axial side opposite the first side for measuring along the axis of the shaft the displacement of the second bearing relative to the second bearing recess when the attachment is tightened; and
    a replaceable shim supported on the shaft, the shim being located between the first bearing and the first bearing recess or between the second bearing and the recess of said plate.

4. An apparatus for preloading antifriction bearings located within a casing, said casing comprising first and second casing portions adapted for mutual contact, and having a first bearing recess in the first casing portion and second bearing recess in the second casing portion, means for forcing flanges of the casings into mutual contact, a first bearing located in, and contacting a stop surface in the first bearing recess, a second bearing, and a shaft supported on the first bearing and on the second bearing, said shaft having a first blocking shoulder adapted for contact with the first bearing, and a second blocking surface adapted for contact with the second bearing, said apparatus comprising:
    a plate located between the casing portions, having a third bearing recess within which the second bearing is located;
    load block means for resiliently, elastically resisting displacement of the third bearing recess relative to the second bearing recess along the axis of the shaft as the first and second casing portions are forced into mutual contact, said load block means developing a resisting force between the second bearing recess and the third bearing recess in accordance with the magnitude of said displacement;
    displacement measuring means located in parallel with the load block means between the second and third bearing recesses, for measuring and indicating the magnitude of displacement of the third bearing recess relative to the second bearing recess along the axis of the shaft; and
    a replaceable shim supported on the shaft, the shim being located between the first bearing and the first bearing recess or between the second bearing and the third bearing recess, the thickness of the shim corresponding to a desired magnitude of bearing preload.

5. The apparatus of claim 4 wherein said plate includes a sleeve extending substantially parallel to the shaft, located between the casing portions at aligned attachment holes in the casing portions, the apparatus further comprising:
    a bolt fitted through said attachment holes in the casing portions and through the sleeve, supporting the casing portions on the plate and permitting mutual axial displacement of the first casing portion relative to the second casing portion.

6. The apparatus of claim 4 further comprising means located between the second bearing recess and the third bearing recess for measuring the magnitude of axial forces developed between said second bearing recess and third bearing recess when the casing portion are forced into mutual contact.

7. The apparatus of claim 6 wherein the axial force measuring means are supported adjacent the second bearing recess by a joint that compensates for relative angular misalignment of the second bearing with the second bearing recess.

8. The apparatus of claim 4 wherein the load block means includes:
- a stud having a shank extending axially from said third bearing recess toward said second bearing recess;
- a sleeve surrounding and aligned substantially with the stud, the sleeve seated in said second bearing recess and defining a space between said second and third bearings recesses
- a compression spring located in said space, the spring having a first end contacting a surface of said third bearing recess and second end contacting the sleeve, the spring resisting displacement of the third bearing recess relative to the the second bearing recess along the axis of the shaft as the flanges of the casing are forced into mutual contact.

9. The apparatus of claim 4, further comprising means for driving the shaft in rotation.

* * * * *